Patented Dec. 23, 1952

2,623,037

UNITED STATES PATENT OFFICE 2,623,037

SULFATING POLYVINYL ALCOHOL

Rufus V. Jones, Bartlesville, Okla., assignor to Phillips Petroleum Company, a corporation of Delaware No Drawing. Application August 25, 1949, Serial No. 112,402

13 Claims. (Cl. 260—79.3)

This invention relates to a process for the production of alkali metal polyvinyl sulfate.

Alkali polyvinyl sulfates of varying degrees of substitution are useful as plasticizers, adhesives, and binders. Such compounds are of great importance in the textile processing industries, and they are also useful as additives for drilling muds and well cements.

It is an object of this invention to provide an improved process for the production of alkali metal polyvinyl sulfate.

It is a further object to provide such a process wherein a sulfating agent is reacted with polyvinyl alcohol in the presence of alkali metal and halogen ions together with a tertiary amine.

It is a still further object to provide such a process wherein polyvinyl alcohol is reacted with a selected compound of sulfur trioxide in the presence of an alkali metal halide and a tertiary amine.

It is a still further object to provide such a process in which polyvinyl alcohol is reacted with an alkali metal chlorosulfonate in the presence of a tertiary amine beneath the surface of an inert diluent.

Various other objects, advantages, and features of the invention will become apparent from the following detailed description.

In accordance with my invention, alkali metal polyvinyl sulfate is obtained by reacting selected sulfating agents with polyvinyl alcohol in the presence of metal ions, halogen ions, and a tertiary amine.

In one aspect of the invention, this reaction is effected under the surface of an inert diluent in a reaction vessel. This inert diluent may be benzene, cyclohexane, dioxane, chlorobenzene, toluene, or a paraffinic hydrocarbon, the use of benzene being preferred for this purpose. Thereupon, in accordance with a preferred embodiment of the invention, a solid alkali metal chlorosulfonate and a tertiary amine are successively introduced below the surface of the inert diluent while maintaining a temperature of about 40 to 60° F. These materials are carefully dried prior to their introduction to the reactor, and substantially anhydrous conditions are maintained during the reaction, since the alkali metal chlorosulfonate is a hygroscopic compound. Pyridine is a preferred tertiary amine, although other such compounds, such as picolines, other alkyl pyridines, and quinoline may be used in the reaction. Sodium chlorosulfonate is the preferred alkali metal compound, although the potassium compound and other alkali metal compounds may be used.

After introduction of the chlorosulfonate and tertiary amine, the temperature of the mixture is raised to from 50 to 235° F., preferably 160 to 195° F., and anhydrous polyvinyl alcohol is introduced beneath the surface of the benzene. The reaction is then carried out for a period of 1 to 12 hours, preferably 3 to 6 hours, with mild agitation.

The materials should be added to the reactor in the proportions of .95 to 9.5 mols of alkali metal chlorosulfonate per mol of alcohol, 1.75 to 17.5 mols of tertiary amine per mol of alkali metal chlorosulfonate, and 1.5 to 3.5 mols of inert diluent per mol of chlorosulfonate. The proportion of inert diluent is not critical provided that sufficient diluent is added to completely cover the reactants and thereby maintain anhydrous conditions in the reaction zone.

The alkali metal polyvinyl sulfate resulting from the reaction is purified by washing with a suitable solvent such as benzene, acetone, or methanol. After the nitrogen compounds and chlorides are removed in this manner, the product is freed from solvent and is ready for use. However, if desired, the product may be further refined by dispersion in water and reprecipitation with methanol.

As a specific example of my process, 138.5 grams, or 1 mol, of carefully dried sodium chlorosulfonate was charged to a reactor containing 250 grams, or 3.2 mols, of benzene. The amount of benzene in the reactor was sufficient to cover the reaction components. Five hundred grams, or 6.3 mols, of pyridine were added while maintaining a temperature of 50 to 60° F. Thereupon, 44 grams, or 1 mol, of polyvinyl alcohol was added to the reactor and the temperature was raised to 195° F. Mild agitation of the reaction mixture was maintained by stirring for a reaction period of 8 hours, after which the reactor contents were discharged upon a filter. The residue was purified by dispersing it in water and precipitating with methanol to provide a brittle, light tan polyvinyl sulfate product with an average degree of substitution of 0.6 sodium sulfonate groups for each unit of the molecule. The product was soluble in water and substantially insoluble in methanol, ethanol, isopropanol, and the like.

In another aspect of the invention, alkali metal polyvinyl sulfate is produced by the reaction, with polyvinyl alcohol, of a selected sulfating agent consisting of a compound of sulfur trioxide with pyridine, dioxane, dimethylaniline, or $\beta,\beta'$-dichlorodiethyl ether. The reaction is carried out in the presence of an ion-yielding material consisting of an alkali metal halide, such as sodium chloride, sodium bromide, or their potassium analogues. These materials are successively charged to a reactor in the proportions of 1 to 10 mols of sulfating agent per mol of alcohol or, preferably, 2 to 6 mols of sulfating agent per mol of alcohol. The alkali metal halide is added in the proportion of 0.5 to 1.5 mols per mol of sulfating agent, preferably 1 mol of alkali metal halide per mol of sulfating agent. The tertiary amine should be added in the proportion of 1 to 50 mols per mol of alcohol, and a temperature of 104 to 239° F., preferably 176 to 212° F., should be maintained with a reaction time of 2 to 14 hours.

The preferred sulfating agent is a compound of sulfur trioxide and pyridine, the preferred ion yielding material is sodium chloride, and the preferred tertiary amine is pyridine. When the reaction is completed, the reactor is cooled and the product separated therefrom by filtration or other suitable means.

The mechanism of the reaction, although it has not been definitely established, is probably represented by the following formula:

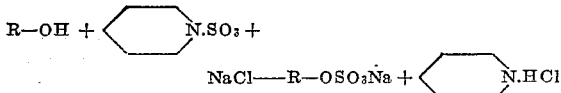

where R represents the polyvinyl alcohol nucleus.

In the above equation, the reaction is self sustaining, that is, the hydrogen atom displaced from the polyvinyl alcohol nucleus and the chlorine atom from the ion-yielding sodium chloride are combined with either the pyridine residue from the sulfating agent or the pyridine solvent to provide pyridine hydrochloride as the single by-product. When operating with other sulfating agents, such as dioxane-sulfur trioxide complex, these residual atoms are taken up by the pyridine solvent, again forming pyridine hydrochloride. When so operating, the dioxane residue constitutes an additional by-product. Thus, while conversions are not necessarily reduced when operating with the various other sulfating agents disclosed above, I have preferred to employ the pyridine-sulfur trioxide sulfating agent, thereby simplifying the operations involved. The degree of substitution has a value of 1.0 in the above given equation. Lower values may be obtained by suitable adjustment of the ratio of reactants, reaction conditions, or both.

It is an advantage of my process that substantially no inorganic salts are formed as reaction by-products, thereby providing simplified purification and recovery of the product. It is also an advantage of my process that the by-product of the reaction is pyridine hydrochloride which can be readily converted to pyridine by treatment with a base, such as sodium hydroxide, and thereby made available for use in subsequent runs.

The length of the reaction period within the range previously specified depends on several factors, such as the ratio of reactants, reaction temperature, and the like. Atmospheric pressures are usually preferred, although pressures above or below atmospheric may be employed when desired. Temperatures somewhat above the ranges previously specified may be employed when operating at superatmospheric pressures.

As a specific example of my process, 160 grams, or 1 mol, of pyridine-sulfur trioxide compound, 44 grams, or 1 mol, of polyvinyl alcohol, 59 grams, or 1 mol, of sodium chloride, and 250 grams, or 3.2 mols, of pyridine were charged to a reactor. The mass was heated for eight hours at 100° F. Pyridine was then removed and the product washed with methanol. The hard resinous material so formed was then pulverized with methanol, after which it was dispersed in water and filtered. The clear, viscous solution was precipitated by pouring it into a large volume of methanol. The tan precipitate was separated in a centrifuge and extracted with methanol until free of chloride ions. A yield of 67 grams of polyvinyl sulfate was obtained. The product had a sulfur content of 16.34 per cent and a sodium content of 13.8 per cent, representing a degree of substitution of approximately 0.46 sodium sulfate groups per polyvinyl alcohol unit.

Although the invention has been described in connection with certain preferred embodiments thereof, it is not to be limited thereby, the scope of the invention being determined by the appended claims.

I claim:

1. A process for producing alkali metal polyvinyl sulfate which comprises reacting polyvinyl alcohol under substantially anhydrous conditions with a sulfating agent selected from the group consisting of an alkali metal chlorosulfonate and a SO₃ complex with a compound selected from the group consisting of pyridine, dioxane, dimethyl aniline and $\beta,\beta'$-dichlorodiethyl ether in the presence of a tertiary amine, and in the presence of an alkali metal halide.

2. A process in accordance with claim 1 in which the alkali metal halide is sodium chloride.

3. A process for the production of alkali metal polyvinyl sulfate which comprises reacting polyvinyl alcohol under substantially anhydrous conditions with an alkali metal chlorosulfonate in the presence of a tertiary amine and an inert diluent.

4. A process in accordance with claim 3 in which the reaction is carried out for a period of 1 to 12 hours at a temperature of 50 to 235° F.

5. A process for the production of alkali metal polyvinyl sulfate which comprises charging an inert diluent to a reaction vessel, introducing successively into the reaction vessel beneath the surface of the inert diluent a solid alkali metal chlorosulfonate, a tertiary amine, and polyvinyl alcohol in the proportions of .95 to 9.5 mols of alkali metal chlorosulfonate per mol of alcohol, and 1.75 to 17.5 mols of tertiary amine per mol of alkali metal chlorosulfonate, and maintaining a temperature of 50 to 235° F. in the reaction vessel for a period of 1 to 12 hours.

6. A process in accordance with claim 5 in which the temperature is maintained within the limits of 160 to 195° F. and the reaction proceeds for a period of 3 to 6 hours.

7. A process in accordance with claim 6 in which the alkali metal chlorosulfonate is sodium chlorosulfonate, the tertiary amine is pyridine, and the inert diluent is benzene.

8. A process for the production of alkali metal polyvinyl sulfate which comprises charging to a reactor an alkali metal halide, a sulfating agent selected from the group consisting of an alkali metal chlorosulfonate and a SO₃ complex with a compound selected from the group consisting of pyridine, dioxane, dimethyl aniline and $\beta,\beta'$-dichlorodiethyl ether, and a tertiary amine, in the proportions of 1 to 10 mols of sulfating agent per mol of polyvinyl alcohol, .5 to 1.5 mol of alkali metal halide per mol of sulfating agent and 1 to 50 mols of tertiary amine per mol of alcohol, and maintaining a temperature of 104 to 239° F. for a period of 2 to 14 hours.

9. A process in accordance with claim 8 in which one mol of alkali metal halide is utilized per mol of sulfating agent, 2 to 6 mols of sulfating agent is utilized per mol of alcohol, and the reaction is carried out at a temperature of 176 to 212° F. for a period of 2 to 14 hours.

10. A process in accordance with claim 8 in which the sulfating agent is a complex of sulfur trioxide and pyridine, the alkali metal halide is sodium chloride, and the tertiary amine is pyridine.

11. A process for producing an alkali metal polyvinyl sulfate which comprises reacting polyvinyl alcohol under substantially anhydrous conditions with a $SO_3$ complex of dioxane in the presence of a tertiary amine and in the presence of an alkali metal halide.

12. A process for producing an alkali metal polyvinyl sulfate which comprises reacting polyvinyl alcohol under substantially anhydrous conditions with a $SO_3$ complex of dimethyl aniline in the presence of a tertiary amine and in the presence of an alkali metal halide.

13. A process for producing an alkali metal polyvinyl sulfate which comprises reacting polyvinyl alcohol, under substantially anhydrous conditions with a $SO_3$ complex of $\beta,\beta'$-dichlorodiethyl ether in the presence of a tertiary amine and in the presence of an alkali metal halide.

RUFUS V. JONES.

REFERENCES CITED

The following references are of record in the file of this patent:

UNITED STATES PATENTS

| Number | Name | Date |
| --- | --- | --- |
| 2,402,647 | Lecher et al. | June 25, 1946 |

OTHER REFERENCES

Karrer et al., Helvetica Chimica Acta, vol. 27, pp. 1422, 1427, 1428, 1944.

Groggins, Unit Processes in Organic Synthesis, 3rd ed., McGraw Hill, 1947, pp. 262 and 295.